United States Patent [19]

Erler

[11] 3,743,911
[45] July 3, 1973

[54] SERVOMOTOR PULSE WIDTH CONTROL CIRCUIT CAPABLE OF COMPENSATING FOR VARIATIONS IN SUPPLY VOLTAGE

[75] Inventor: Irvin L. Erler, Waynesboro, Va.

[73] Assignee: General Electric Company, Lynn, Mass.

[22] Filed: June 18, 1971

[21] Appl. No.: 154,277

[52] U.S. Cl.............. 318/599, 318/629, 318/341, 318/331, 307/265
[51] Int. Cl. .......................................... G05b 11/28
[58] Field of Search.................. 318/599, 341, 331, 318/629; 307/265

[56] References Cited
UNITED STATES PATENTS

| | | | |
|---|---|---|---|
| 3,518,520 | 6/1970 | Molner | 318/331 |
| 3,525,029 | 8/1970 | Joslyn et al. | 318/599 |
| 3,446,992 | 5/1969 | Webb | 318/599 |

Primary Examiner—T. E. Lynch
Attorney—William S. Wolfe, Joseph H. Yamaoka et al.

[57] ABSTRACT

A servomotor control circuit capable of compensating for variations in the output voltage of a poorly regulated or unregulated direct current power supply. A triangular waveform having an amplitude dependent upon the amplitude of the power supply output is compared in first and second comparator amplifiers to normal and inverted forms, respectively, of a motor control signal. The output signals of the comparator amplifiers determine the state of first and second switches connecting opposite terminals of the servomotor to the power supply. The width of a voltage pulse applied to the servomotor is inversely related to the magnitude of the power supply output voltage, making the average applied voltage substantially independent of the magnitude of the power supply output voltage.

10 Claims, 13 Drawing Figures

Patented July 3, 1973

INVENTOR.
IRVIN L. ERLER
BY Gerald R. Woods
HIS ATTORNEY

Patented July 3, 1973

INVENTOR.
IRVIN L. ERLER
BY Gerald R. Woods
HIS ATTORNEY

INVENTOR.
IRVAN L. ERLER
HIS ATTORNEY

Patented July 3, 1973  3,743,911

INVENTOR.
IRVIN L. ERLER
BY Gerald R. Woods
HIS ATTORNEY

SERVOMOTOR PULSE WIDTH CONTROL CIRCUIT CAPABLE OF COMPENSATING FOR VARIATIONS IN SUPPLY VOLTAGE

BACKGROUND OF THE INVENTION

The present invention relates to the control of servomotors, and more particularly to servomotor control circuits which can use poorly regulated or unregulated DC power supplies without degrading servomotor performance.

Direct current servomotors are used in a wide variety of systems to drive a controlled member at a velocity or to a position established by command signals applied to the motor. For example, in a numerical control system, direct current servomotors may be used to drive the machine tool spindle or the machine tool table along orthogonal axes of movement. In the type of numerical control system referred to as contouring control, the relative velocity of a cutting tool and a workpiece along the several axes determines the final contour of the workpiece being machined.

In known prior art systems, close control of servomotor velocity has been achieved by using a highly regulated DC power supply for the servomotor. Since regulated power supplies are considerably more expensive than poorly regulated or unregulated supplies, a need has existed for a servomotor control circuit which is capable of using a poorly regulated or unregulated power supply without adversely affecting servomotor performance.

SUMMARY OF THE INVENTION

The purpose of the present invention is to provide a servomotor control circuit which compensates for variations in the output voltage produced by a poorly regulated or perhaps unregulated direct current power supply. The system in which the circuit is used includes the servomotor, a first signal source which produces a variable unidirectional electrical signal, the direct current power supply, and first and second switching means for selectively connecting first and second terminals of the servomotor to the direct current power supply. The control circuit includes a second signal source which generates a triangular waveform having an amplitude dependent upon the magnitude of the power supply output voltage. An inverter is connected to the output of the first or the second signal source to produce an inverted form of the signal provided by that source. A first comparing means connected to the inverter and to the other of the signal sources drives one of the switching means into conduction when the normal output signal is greater than the inverted output signal. A second comparing means is connected to the outputs of the first and second signal sources. The second comparing means responds to drive the second switching means into conduction whenever the second output signal is greater than the first. This control circuit causes the width of the voltage pulses across the servomotor to vary inversely with the magnitude of the output voltage of the direct current power supply. Therefore, the average voltage applied to the servomotor is substantially independent of variations in the output voltage of the direct current power supply.

DESCRIPTION OF THE DRAWINGS

While the specification concludes with claims particularly pointing out and distinctly claiming that which is regarded as the present invention, further details of particular embodiments of the invention may be more readily ascertained from the following detailed description when read in conjunction with the accompanying drawings wherein:

DETAILED DESCRIPTION

Figure 1:
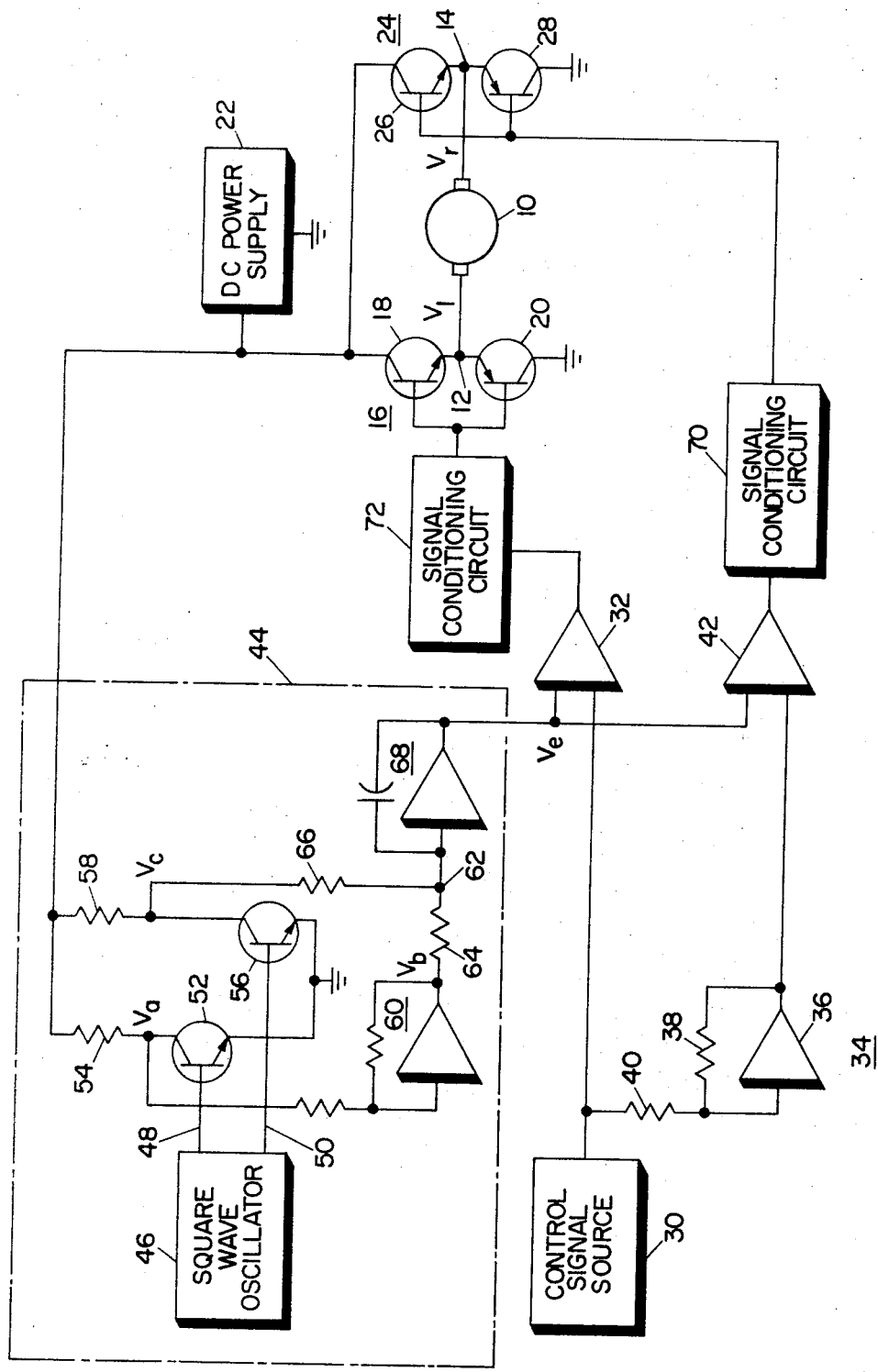
FIG. 1 is a schematic diagram of a servomotor control system including a control circuit constructed in accordance with the present invention.

Referring now to FIG. 1, a servomotor control system is depicted wherein a servomotor 10 is controlled by modulating the width of voltage pulses applied to a first or left terminal 12 and a second or right terminal 14. The voltage applied to the terminal 12 is controlled by a first switch 16 which, as shown in simplified form, includes a first NPN transistor 18 and a first PNP transistor 20 forming a series current path between the output of a direct current power supply 22 and a system common terminal denoted by a conventional ground symbol. The voltage applied to the terminal 14 is similarly controlled by a second switch 24 shown as a second NPN transistor 26 and a second PNP transistor 28 connecting power supply 22 and the system common.

The widths of voltage pulses formed by the operation of switches 16 and 24 are directly related to the magnitude of a unidirectional motor control signal provided by a control signal source 30. The control signal magnitude is a function of the commanded velocity of the servomotor 10 while its polarity is a function of the commanded direction of rotation of the servomotor 10. The control signal is applied both to one input of a first comparing means or comparator amplifier 32 and to an inverter 34 consisting of an operational amplifier 36 having a feedback resistor 38 connected between its input and output, and an input resistor 40 connected to the output of signal source 30. Inverter 34 supplies an inverted form of the control signal to one input of a second comparing means or comparator amplifier 42.

A waveform generator 44 is connected to another input to each of the comparator amplifiers 32 and 42. Waveform generator 44 produces a triangular waveform having an amplitude dependent upon the magnitude of the output voltage of power supply 22. A square wave oscillator 46 having output terminals 48 and 50 produces square wave pulses at these terminals which have the same magnitude and frequency but which are 180° out of phase with one another. The output terminal 48 is connected to the base terminal of an NPN transistor 52 having its emitter terminal connected to the system common terminal and its collector terminal connected to the power supply 22 through a collector resistor 54. The output terminal 50 is connected to the base terminal of a matched NPN transistor 56 which similarly has its emitter terminal connected to the system common terminal and its collector terminal connected to the power supply 22 through a collector resistor 58. The collector terminal of transistor 52 is connected to an inverter 60, the output of which is connected to a current summing junction 62 through a resistor 64. The collector terminal of the transistor 56 is connected to current summing junction 62 through another resistor 66. The currents summed at junction 62 are integrated by an integrating amplifier 68, the output of which is connected to inputs to both comparator amplifiers 32 and 42. Due to the integrating action of amplifier 68, the generated waveform is triangular at these inputs.

Comparator amplifiers 32 and 42 are well-known devices which generate a first output voltage when a first input signal exceeds a second input signal and a second different output voltage when the second input signal exceeds the first input signal. In the illustrated circuit, both comparator amplifiers 32 and 42 respond whenever the triangular waveform voltage exceeds the control signal voltage to produce a high output voltage. The output of the comparator amplifier 32 is applied to a signal conditioning circuit 68 which converts the comparator output to the proper voltage level to affect conduction through the transistors 18 and 20. The output of comparator amplifier 42 is similarly converted to a desired level by a signal conditioning circuit 70.

Figure 2:
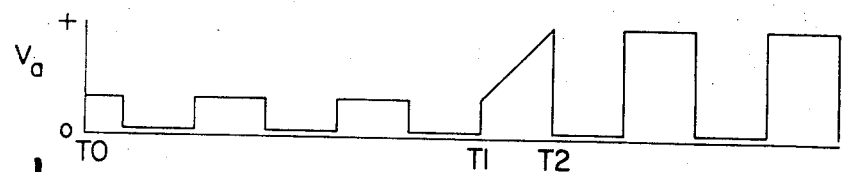
FIG. 2, consisting of FIGS. 2a through 2f, depict waveforms which are generated by the circuit disclosed in FIG. 1.
Figure 2:
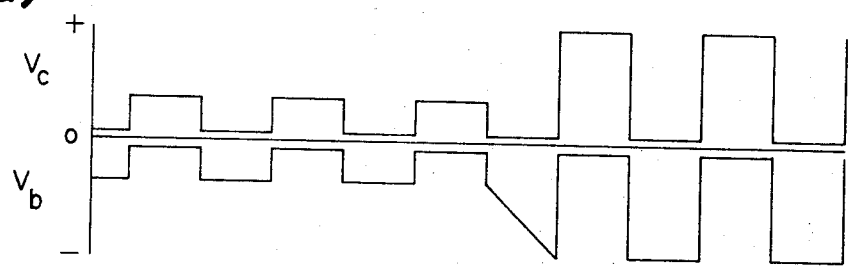
Figure 2:
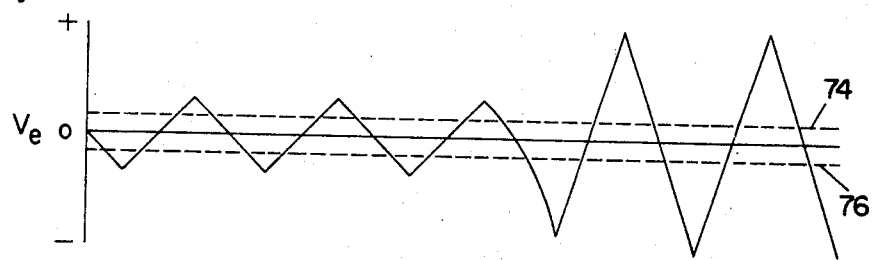
Figure 2:
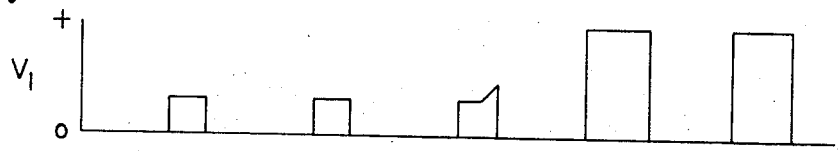
Figure 2:
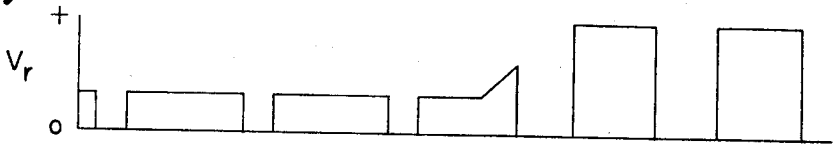
Figure 2:
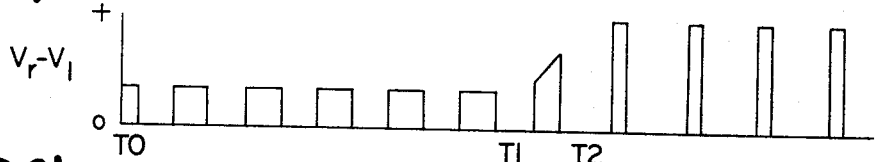

The operation of the circuit described above is explained with reference to the waveforms depicted in FIG. 2. In a preferred embodiment of the invention, square wave oscillator 46 generates a square wave having a frequency of approximately 1,000 Hz. The function of the square wave is to alternately drive transistors 52 and 56 into conduction to drive the collector terminal of those transistors to a voltage approaching the system common voltage. During non-conducting intervals, the voltage on the collector terminals of transistors 52 and 56 increases to a value proportional to the value of the output voltage of the power supply 22. If an unregulated power supply has a nominal output voltage of 60 volts, the actual output voltage may vary from 50 to 80 volts. With voltages in this range being applied at the upper ends of collector resistors 54 and 58, the voltages on the collector terminals should increase into the range of 17 to 26 volts.

The attainable collector terminal voltages are considerably less than the output voltage of the power supply 22 because the collector resistors 54 and 58 form voltage dividers with the resistors 64 and 66 connected to the current summing junction 62. Because the integrating amplifier 68 attempts to maintain the voltage at current summing junction 62 at the system common level, the attainable voltage on the collector terminal for transistor 56, for example, depends upon the ratio of the ohmic values of resistors 58 and 66. While the attainable voltages on the collector terminals of transistors 52 and 56 are lower than the output voltage of the power supply 22, the collector voltages, nevertheless, do vary in direct proportion to variations in output voltage of power supply 22.

FIG. 2a shows the voltage $V_a$ on the collector terminal of transistor 52. The collector voltage $V_a$ is a positive square wave having a small DC component during the time period between voltage pulses. For illustrative purposes, it is assumed that the output voltage of the power supply 22 remains at a constant value from time T0 to time T1 and thereafter increases to a second greater value by time T2. The waveform $V_c$ which is generated at the collector terminal of transistor 56 is generally similar to the waveform $V_a$ but is 180° out of phase with that waveform. Since transistor 56 is non-conducting from time T1 to time T2, the waveform $V_c$ is not substantially altered by the increase occurring during that period. The next voltage pulse in waveform $V_c$ will, however, have a magnitude proportional to the increased output voltage of power supply 22. The waveform $V_a$ is inverted by the inverter 60 to generate the waveform $V_b$ shown in FIG. 2b. This waveform has the same magnitude and phase as the waveform $V_a$ but has an opposite polarity.

The currents which are produced when the voltages $V_b$ and $V_c$ are applied at resistors 64 and 66 respectively are summed at current summing junction 62 to generate a bi-polar square wave having peak magnitudes directly dependent upon the output of the power supply 22. The direct current component of voltages $V_b$ and $V_c$ are cancelled out, leaving an alternating square wave. Since the square wave at junction 62 should have low rise or fall times, the integrated form of that wave, which appears at the output of integrating amplifier 68, is a triangular waveform $V_e$ with substantially rectilinear segments whenever the output of the power supply 22 remains constant. If the output of the power supply 22 varies, the shape of the segments of waveform $V_e$ also varies. For example, if the output of the power supply 22 increases linearly, the waveform $V_e$ varies parabolically during the period of increase.

The triangular waveform $V_e$ is compared in the first and second comparator amplifiers 32 and 42 with a normal form 74 and an inverted form 76 of the control signal provided by source 30. The triangular waveform voltage $V_e$, a normal control signal 74 and an inverted control signal 76 are illustrated in FIG. 2c. During those time intervals when the magnitude of the triangular waveform is greater than the magnitude of normal control signal 74, comparator amplifier 32 produces a higher voltage. After conditioning in the signal conditioning circuit 72, this high voltage causes transistor 18 to be driven into conduction and transistor 20 to be driven into non-conduction, thereby completing a connection between terminal 12 of servomotor 10 and power supply 22. FIG. 2d illustrates the voltage $V_1$ appearing at terminal 12. Whenever the triangular waveform is greater then the inverted control signal 76, the comparator amplifier 42 produces a high voltage which, after conditioning in signal conditioning circuit 70, drives transistor 26 into conduction and transistor 28 into non-conduction. FIG. 2e illustrates the voltage $V_r$ at terminal 14.

When the voltages $V_1$ and $V_r$ are equal, no current passes through the servomotor 10. As may be seen in FIG. 2f, a voltage exists across servomotor 10 only during those time intervals when $V_r$ is at a positive value and $V_1$ is zero. Thus, the widths of voltage pulses measured across servomotor 10 are established as a function of the control signal and of the output voltage of the power supply 22. The magnitude of the voltage at the terminals 12 and 14 is, of course, directly dependent upon the magnitude of the output voltage of power supply 22.

Although the amplitude of the triangular waveform varies in direct proportion to the output voltage of the power supply 22, the width of voltage pulses across servomotor 10 vary in inverse proportion to the power supply output voltage. The net effect of the inverse variation is to decrease the pulse widths in inverse proportion to the increase in the height of magnitude of the voltage pulses. These changes in the shape of the voltage pulse offset one another to cause the average voltage across the servomotor 10 to remain substantially independent of the output of the power supply 22 and instead totally dependent upon the magnitude of the control signal provided by source 30. This compensating action is illustrated best in FIG. 2f. It can be seen from time $T_0$ to time $T_1$, the magnitude of the voltage pulses across servomotor 10 is relatively low while each pulse lasts for a relatively long time. It can further be seen that at time $T_1$, the magnitudes of the pulses increase with the increase in the output voltage of power supply 22, but that the pulse widths decrease. While the pulse shapes change, the average voltage does not. Therefore, effective compensation for variations in the output voltage of the power supply 22 is provided.

Figure 3:
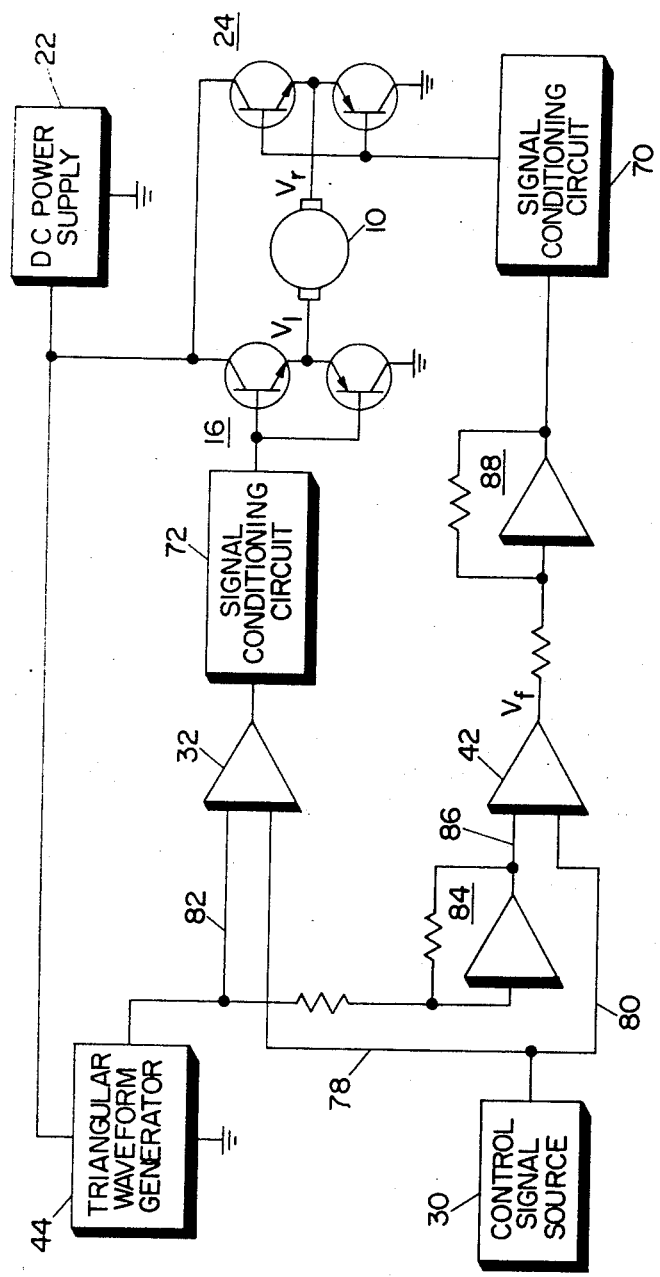
FIG. 3 is a schematic diagram of an alternate embodiment of a servomotor control system including the present invention.

While the circuit described above represents a preferred embodiment of the present invention, alternate embodiments may be constructed using the principles of the present invention. FIG. 3 illustrates one such alternate embodiment. Since many of the elements in the system shown in FIG. 3 also appear in the system shown in FIG. 1, like elements have been designated with like numerals.

The system illustrated in FIG. 3 is similar to the system described with reference to FIG. 1 in that the system function is to control the speed and direction of rotation of a servomotor 10 by means of transistor switches 16 and 24 which can connect opposite servomotor terminals either to the direct current supply 22 or to a system common. The triangular waveform generator 44, the control signal source 30, comparator amplifiers 32 and 42, and signal conditioning circuits 70 and 72 serve the same functions as in the system described which reference to FIG. 1. Unlike the previously described system wherein the control signal provided by source 30 is inverted before being applied to one of the comparator amplifiers 32 and 42, that control signal is applied in normal form to both comparator amplifiers 32 and 42 over leads 78 and 80 in the alternate embodiment. Further, while the normal output of triangular waveform generator 44 is applied to one input of comparator amplifier 32 through lead 82 in FIG. 3, that waveform is inverted by an inverter 84 before being applied to the input 86 of comparator amplifier 42. The output of comparator amplifier 42 is applied to another inverter 88 where the sense of the output signal is reversed before that signal is applied to signal conditioning circuit 70.

Figure 4:
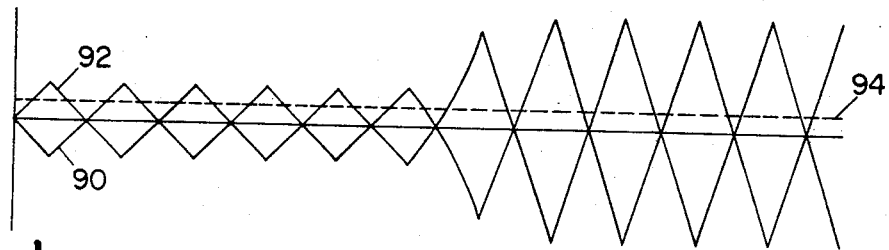
FIG. 4, consisting of FIGS. 4a through 4e, depicts waveforms which are generated by the alternate embodiment shown in FIG. 3.
Figure 4:
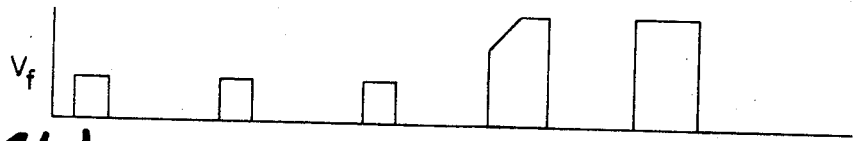
Figure 4:
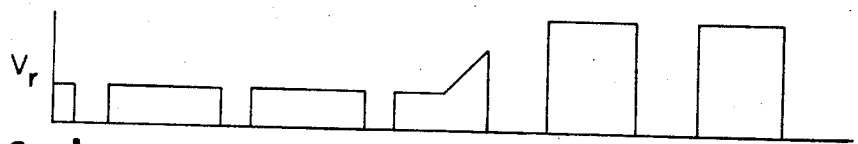
Figure 4:
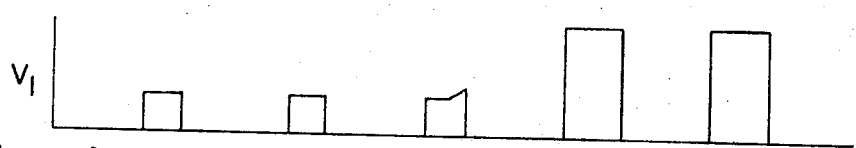
Figure 4:
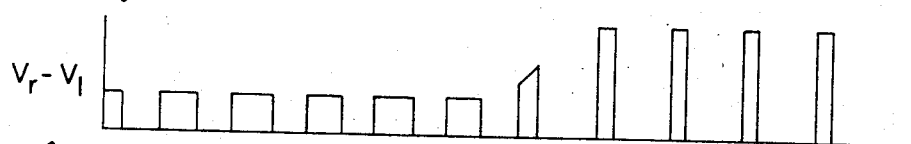

The operation of the alternate embodiment of the system is described with reference to FIG. 4 consisting of FIGS. 4a through 4e.

FIG. 4a depicts the normal waveform 90 of the triangular waveform as it is applied to input 82 of comparator amplifier 32 and the inverted form 92 which is applied to input 86 of comparator amplifier 42. The function of comparator amplifier 42 is to compare the magnitude of the inverted form 92 of the triangular waveform as it appears on input 86 with the magnitude of the control signal 94 appearing on input 80 and to generate a voltage pulse having a magnitude dependent on the magnitude of the power supply output voltage and a duration equal to the time interval during which the inverted signal 92 is greater than the control signal 94. The output $V_f$ of comparator amplifier 42 is illustrated in FIG. 4b. The voltage $V_f$ is inverted by inverter 88 and conditioned by signal conditioning circuit 70 to derive the voltage $V_r$ used to control the transistor switch 24. The voltage $V_r$ is illustrated in FIG. 4c which, it should be noted, is identical to FIG. 2e.

The function of comparator amplifier 32 is to compare the normal form 90 of the triangular waveform with the control signal 94. The magnitude of voltage pulses produced by comparator amplifier 32 depends upon the magnitude of the power supply output voltage while the duration of the pulses is determined by the length of time during which the normal form 90 is greater than the control signal 94. The voltage used to control transistor switch 16 and thus to derive the voltage $V_r$ is determined by the output of comparator amplifier 32 as that output is conditioned by signal conditioning circuit 72. The voltage $V_1$ is illustrated in FIG. 4d which, it should be noted, is identical to FIG. 2e.

While the intermediate signal processing steps are different in some respects in the systems illustrated in FIGS. 1 and 3, the finally-derived voltage pulses applied to the servomotor terminals are the same for the same control signals and power supply output voltages. Since the voltage pulses appoied to the left and right terminals of the servomotor 10 are the same in either system, it can be expected that the same pattern of voltage is established across the servomotor 10. FIGS. 4e and 2f are identical, illustrating that identical results are achieved whether the primary or the alternate embodiment of the system is used.

While there have been described what are considered to be preferred embodiments of the present invention, variations and modifications therein may occur to those skilled in the art once they become familiar with the invention. Therefore, it is intended that the appended claims shall be construed to include all such variations and modifications as fall within the true spirit and scope of the invention.

I claim:

1. For use in a system having a servomotor, a motor control signal source, a direct current power supply and first and second switches for connecting first and second servomotor terminals respectively to the power supply whenever the associated switch is in an on condition, a control circuit for minimizing the effects on servomotor performance of variations in the output voltage of the power supply comprising:
   a. a waveform generator connected to the power supply for generating a triangular waveform voltage having an amplitude dependent upon the amplitude of the power supply output voltage;
   b. an inverter connected to the motor control signal source for inverting the control signal supplied by the source;
   c. a first comparator having a first input connected to the waveform generator, a second input connected to the signal source and an output connected to the first switch; and
   d. a second comparator having a first input connected to the waveform generator, a second input connected to the inverter and an output connected to the second switch;
   e. each of the comparators operating independently to trigger its associated switch into an on condition whenever the first comparator input exceeds the second comparator input.

2. A control circuit as recited in claim 1 wherein the waveform generator comprises:

a. a square wave generator connected to the DC power supply for generating a square wave having peak positive and negative voltages proportional to the output voltage of the power supply; and b. an integrator connected to the square wave generator for integrating the generated square wave to derive the triangular waveform voltage.

3. A control circuit as recited in claim 2 wherein said square wave generator comprises:

a. a square wave oscillator having normal and inverted outputs;

b. a first semiconductor device having first and second terminals connecting the device between the power supply and a common terminal, a control terminal connected to one of the oscillator outputs and an output terminal at a point between the semiconductor device and the power supply;

c. a second semiconductor device having first and second terminals connecting the device between the power supply and the common terminal, a control terminal connected to the other of the oscillator outputs and an output terminal at a point between the semiconductor device and the power supply;

d. an inverter connected to the output terminal of one of the semiconductor circuits for inverting an output therefrom; and e. a current summing junction connected to the output of the inverter and to the output terminal of the other of the semiconductor circuits.

4. A control circuit as recited in claim 2 wherein the integrator comprises:

a. an operational amplifier having an output terminal connected to the first inputs of the first and second comparators and an input terminal;

b. resistance means connected in series between the input terminal and the output of the square wave generator; and c. a feedback capacitor connected between the input and output terminals of the operational amplifier.

5. A control circuit as recited in claim 3 wherein the integrator comprises:

a. an operational amplifier having an output terminal connected to the first inputs of the first and second comparators and an input terminal connected to the current summing junction; and b. resistance means connected in series between the input terminal and the output of the square wave generator; and c. a feedback capacitor connected between the input and output terminals of the operational amplifier.

6. A control circuit as recited in claim 3 wherein each of the semiconductor devices comprises an NPN transistor having its collector terminal connected in circuit with the power supply, its emitter terminal connected to the common terminal and its base terminal connected to one of the outputs of the square wave oscillator.

7. For use in a system having a servomotor, a first signal source for producing a variable unidirectional electrical signal, a direct current power supply, and first and second switching means for connecting first and second servomotor terminals respectively to the power supply whenever the associated switch is in a conducting condition, a control circuit for minimizing the effects on servomotor performance of variations in the output voltage of the power supply including:

a. a second signal source for generating a triangular waveform having an amplitude dependent upon the amplitude of the power supply output voltage;

b. inverting means connected to the output of one of the first and second signal sources for producing an inverted form of the output signal provided by that source;

c. first comparing means connected to the inverting means and to the other of the signal sources, the first comparing means responding when normal output signal is greater than the inverted output signal to drive one of the switching means into conduction; and d. second comparing means connected to the outputs of the first and second signal sources, the second comparing means responding when the second output signal is greater than the first output signal to drive the other of the switching means into conduction.

8. For use in a system having a servomotor, a direct current power supply and switch means for selectively energizing the servomotor from the power supply, a control circuit for minimizing the effects on servomotor performance of variations in the output voltage of the power supply comprising:

a. a waveform generator responsive to the power supply voltage for generating a triangular waveform signal having a fixed frequency and an amplitude proportional to the amplitude of the power supply voltage; and b. circuit means responsive to a control signal and to the triangular waveform signal for operating the switching means so that the power supply energizes the servomotor for a time directly proportional to the amplitude of the control signal and inversely poportional to the slope of the triangular waveform signal.

9. A control circuit as recited in claim 8 wherein the circuit means includes comparison circuit means for operating the switching means to selectively energize the servomotor from the power supply when the triangular waveform signal exceeds a first signal level and is less than the control signal level.

10. A control circuit as recited in claim 9 wherein the first signal level is equal in magnitude but of opposite polarity to the control signal.

* * * * *